United States Patent
Mancosu et al.

(10) Patent No.: US 7,856,871 B2
(45) Date of Patent: Dec. 28, 2010

(54) WHEEL FOR VEHICLES

(75) Inventors: Federico Mancosu, Milan (IT); Massimo Brusarosco, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 59 days.

(21) Appl. No.: 12/309,640

(22) PCT Filed: Jul. 28, 2006

(86) PCT No.: PCT/IT2006/000591

§ 371 (c)(1),
(2), (4) Date: Jan. 26, 2009

(87) PCT Pub. No.: WO2008/012850

PCT Pub. Date: Jan. 31, 2008

(65) Prior Publication Data

US 2009/0188310 A1 Jul. 30, 2009

(51) Int. Cl.
*B60C 23/02* (2006.01)
(52) U.S. Cl. .................................... 73/146.5
(58) Field of Classification Search .................. None
See application file for complete search history.

(56) References Cited

U.S. PATENT DOCUMENTS

| | | | |
|---|---|---|---|
| 5,941,692 A | 8/1999 | Olney et al. | |
| 7,138,911 B2 * | 11/2006 | Tyndall | 340/447 |
| 7,260,984 B2 * | 8/2007 | Roundy et al. | 73/146.5 |
| 7,379,800 B2 * | 5/2008 | Breed | 701/29 |
| 2002/0162389 A1 * | 11/2002 | Yokota et al. | 73/146 |
| 2003/0209063 A1 * | 11/2003 | Adamson et al. | 73/146 |
| 2003/0209064 A1 * | 11/2003 | Adamson et al. | 73/146 |
| 2004/0118197 A1 * | 6/2004 | Bulst et al. | 73/146 |
| 2004/0211250 A1 * | 10/2004 | Adamson et al. | 73/146 |
| 2006/0243043 A1 * | 11/2006 | Breed | 73/146 |
| 2007/0074566 A1 * | 4/2007 | Roundy et al. | 73/146 |
| 2007/0295069 A1 * | 12/2007 | Mancosu et al. | 73/146 |
| 2009/0211353 A1 * | 8/2009 | Gao et al. | 73/146.5 |
| 2010/0083746 A1 * | 4/2010 | Chen et al. | 73/146.4 |

FOREIGN PATENT DOCUMENTS

| | | |
|---|---|---|
| DE | 27 51 797 A1 | 5/1979 |
| FR | 2 658 759 A1 | 8/1991 |
| JP | 2000-278923 | 10/2000 |
| JP | 2005-022457 | 1/2005 |
| WO | WO 2005/067073 A1 | 7/2005 |
| WO | WO 2006/048899 A1 | 5/2006 |

* cited by examiner

*Primary Examiner*—Andre J Allen
(74) *Attorney, Agent, or Firm*—Finnegan, Henderson, Farabow, Garrett & Dunner, LLP (57) ABSTRACT

A wheel for vehicles includes a rim, a tyre mounted on the rim, and at least one device for energy generation operatively associated with the tyre. The device for energy generation includes a first element that is fixed relative to the rim or to the tyre, and a second element mounted on the first element and free to rotate relative to the first element around a predetermined rotation axis. The second element has a mass centre eccentric to the predetermined rotation axis. The device for energy generation further includes an electric generator having a stator mounted on the first element and a rotor mounted on the second element.

44 Claims, 5 Drawing Sheets

WHEEL FOR VEHICLES

CROSS REFERENCE TO RELATED APPLICATION

This application is a national phase application based on PCT/IT2006/000591, filed Jul. 28, 2006, the content of which is incorporated herein by reference.

BACKGROUND OF THE INVENTION

1. Field of the Invention

The present invention relates to a wheel for vehicles. In particular, the present invention relates to wheels provided with devices for generating electric energy needed for powering devices installed in the tyre or on the rim of said wheel.

2. Description Of Related Art

These devices are, for instance, defined by detecting units capable of monitoring the operating conditions (pressure and temperature, for example) of the tyres and possibly adapted to keep a trace of the evolution in time of parameters representative of this operation, or they can be embodied by actuators such as pumps adapted to keep pressure within the tyre substantially constant.

The parameters that are generally considered may be identification code, temperature, pressure, distance covered by the tyre, load, as well as parameters resulting from mathematical processing operations that can be executed within the tyre itself (such as forces, accelerations, deformations).

In particular, in case of vehicles using tyres of the run flat type, i.e. tyres capable of ensuring that some kilometric distance may be run even with a deflated tyre, provided some operating parameters are observed such as maximum speed, temperature and maximum distance that can be travelled over, said detecting units become of fundamental importance to enable safe use of said type of tyres.

For the purpose, a detecting system can be mounted inside the tyre which may comprise at least one detecting unit, a control and/or data storage unit (such as a microprocessor), and an antenna. The antenna's task is to enable radio-frequency signal exchange with the devices mounted on board the vehicle. In addition, the detecting system comprises a powering unit adapted to supply the electric energy required for operation of same.

Document WO 2006/048899, in the name of the same Applicant, relates to a tyre for vehicle wheels of the type provided with an antenna to enable transmission and/or reception of operating parameters of the tyre itself, for example. The antenna is also used to feed the detecting unit and the devices associated therewith, so as to avoid use of self-governing powering units placed within the tyre. For the purpose the antenna has a coil-shaped conformation so as to enable coupling with an electromagnetic field generated by a device present on board the vehicle, and to absorb the necessary energy for feeding the detecting unit.

Document WO 2005/067073, in the name of the same Applicant, shows a tyre comprising a flexible piezoelectric element associated with a device for energy storage. The flexible piezoelectric element is mounted in overhanging in a container so that it can be positioned substantially along a plane perpendicular to a radial direction of the tyre and in such a manner that a first end of the piezoelectric element is linked to the container. A mass is engaged with the second end of the flexible piezoelectric element. A small interspace is defined between the inner walls of the container and the outer surface of the mass, to enable a limited bending of the piezoelectric element. The container holding the piezoelectric element is mounted to a portion of the tyre close to the tread, preferably on an inner surface of the tyre. The piezoelectric element bends under the radial-acceleration action when the tyre rolls.

U.S. Pat. No. 5,941,692 shows a pump provided with a resonant oscillating mass suitably adjusted, which pump is installed within the tyre or on the wheel rims of motor-vehicles, to maintain the optimal tyre pressure and generate electric energy through movement of said oscillating mass. This oscillating mass can be a pendulum or a ball free to roll in an arched chamber. The oscillating mass takes its energy from the gravitational field for rotation of the tyre/rim on which the mass itself is installed. This mass oscillates under the influence of the force of gravity and the centripetal radial force. Oscillation of the pendulum/ball can be employed to deflect a piezoelectric element whose output electric signal can be used to energise sensors or other electric apparatus. The electric energy can also be generated by movement of the pendulum/ball, through magnetisation of the oscillating mass and making this mass pass close to a rotor/coil.

In this technical field, the Applicant has felt the necessity:
- to improve the construction simplicity of the devices for generating electric energy manufactured according to the teachings of the above mentioned documents;
- to increase reliability of said devices;
- to reduce bulkiness and weight of same;
- to increase the efficiency of these devices as compared with known devices, in order to at most exploit the energy produced by the tyre deformation and/or movement of the wheel;
- to enable a quick and easy installation, without requiring any part of the device being installed out of the wheel.

The Applicant has noticed that, since as regards the antenna and the device for generating the magnetic field described in document WO 2006/048899 mounting of elements on the vehicle is required, installation of same needs modification of the vehicle itself and is therefore complicated. In addition, each time replacement of the tyre is required, it is of the greatest importance that the new tyre should contain elements (antenna, detecting unit, etc.) that are compatible with the device installed on the vehicle.

The Applicant has further found that the powering unit of document WO 2005/067073 is not able to fully exploit the kinetic energy generated by rolling of the tyre. In fact, deformation of the piezoelectric element, due to the forces acting on the mass, is necessarily limited by the presence of the container's inner wall performing the function of stop limit, under pain of breakage of the piezoelectric element itself. Therefore, forces of inertia that, in the absence of said stop limit, would cause a greater deformation of the piezoelectric element cannot be fully converted into electric energy.

The Applicant has also observed that the resonant oscillating mass described in document U.S. Pat. No. 5,941,692 must necessarily be installed on one side of the wheel with the oscillation axis parallel to the rotation axis of the wheel itself, so that the centripetal force and the force of gravity may cause oscillation of same, and this constraint is a limitation in terms of flexibility of use.

The Applicant has finally noticed that the embodiments shown in documents WO 2005/067073 and U.S. Pat. No. 5,941,692 hardly succeed in being very efficient in converting the mechanical energy into electric energy, said mechanical energy being generated by the forces acting on the tyre, due to the constraints provided in these embodiments, all having a stop limit.

SUMMARY OF THE INVENTION

The Applicant has therefore perceived that the solution to the problems highlighted above can be found by implementing a device on a wheel which is capable of generating electric energy from conversion of the mechanical energy generated by the forces acting on the tyre through a mechanism free of constraints or stop positions, such as said stop limits. For instance this occurs in the event of a relative rotatory movement between two elements pivotally mounted on each other.

The Applicant has finally found that use of an electric generator comprising a stator, mounted on a first element adapted to be linked to the rim or the tyre, and a rotor installed on a second element free to rotate relative to the first one around a predetermined rotation axis and provided with a mass centre eccentric to said predetermined rotation axis, enables the previously depicted problems to be solved.

In fact, during use of the motor-vehicle, the wheel is submitted to accelerations imparted by the motor and the braking system and by forces transmitted from the road surface. These forces result in variable accelerations (in terms of intensity, direction and way) on the electric generator associated with the wheel. The accelerations acting on the second element, with a mass centre eccentric to the rotation axis, cause arising of variable forces of inertia capable of causing oscillation/rotation of the rotor relative to the stator and consequent generation of electric energy.

In particular, during its rolling on the road, the tyre is submitted to variable deformations above all concentrated in the region of the footprint on the ground and in the adjacent ones. These deformations result in variable accelerations (in terms of intensity, direction and way) on the tyre and the electric generator associated therewith.

In particular, in a first aspect, the present invention relates to a wheel for vehicles comprising: a rim, a tyre mounted on the rim, at least one device for energy generation operatively associated with said tyre; wherein said at least one device for energy generation comprises: a first element that is fixed relative to said rim or to said tyre; a second element that is mounted on the first element and is free to rotate relative to said first element around a predetermined rotation axis, the second element having a mass centre eccentric to the predetermined rotation axis; and an electric generator having a stator mounted on the first element and a rotor mounted on the second element.

In accordance with one embodiment, the second element comprises at least one concentrated mass spaced apart from the predetermined rotation axis.

Preferably, the second element comprises a plurality of concentrated masses disposed around the predetermined rotation axis.

Use of concentrated masses allows manufacture and gauging of the device for energy generation to be simplified. In fact, these masses can be installed on the second element in the right positions and the right number after manufacture of said second element.

Still more preferably, the second element comprises three concentrated masses disposed around the predetermined rotation axis.

In addition, the three concentrated masses have different angular distances from each other.

By adopting only three masses disposed as above specified, the effect of the forces and moments acting on the second element can be maximised and simultaneously the complexity of the device can be reduced.

Advantageously, the bodies corresponding to the concentrated masses have the same density and same volume.

If all bodies corresponding to the masses are made identical with each other in terms of volume and density, the production costs can be minimised.

According to a preferred embodiment, the first element and second element are defined by respective parallel discs mutually spaced apart and connected by a pin extending along the predetermined rotation axis. In addition the discs are coaxial.

This structure, above all in combination with the fact of adopting concentrated masses, is simple and efficient.

According to one embodiment, the stator is a conductive element and the rotor is a permanent magnet.

Alternatively, the rotor is a conductive element and the stator is a permanent magnet.

Positioning of the conductive element and the element responsible for generation of the electromagnetic field can be selected based on the specific construction requirements.

According to a further embodiment, the stator is a conductive element and the rotor comprises a material of the "electret" type.

Alternatively, the rotor is a conductive element and the stator comprises a material of the "electret" type.

Use of materials referred to as "electrets" enables the sizes of the device to be reduced while allowing generation of considerable values of voltage/electric current. An "electret" (a word formed of the combination of two words, i.e. "electricity" and "magnet") is a material having a quasi-permanent electric charge or a dipole polarisation. The magnetic equivalent of same is the permanent magnet. Materials present in nature, such as quartz and other forms of silicon dioxide, are of the "electret" type. Presently many "electrets" are polymeric materials.

In addition, preferably, said at least one device for energy generation further comprises a casing housing the first element and second element.

The casing ensures the necessary protection to the device and allows a quick installation/demounting of same.

Preferably, the predetermined rotation axis of said at least one device for energy generation is oriented in a radial direction of the tyre. This orientation allows the longitudinal and transverse forces acting on the wheel/tyre to be exploited.

Alternatively, the predetermined rotation axis of said at least one device for energy generation is oriented in an axial direction of the tyre. In this way, it is possible to exploit the longitudinal and radial forces acting on the wheel/tyre.

According to one embodiment, the wheel has a valve mounted on the rim, and said at least one device for energy generation is installed on said valve.

Preferably, said at least one device for energy generation is installed on a closing plug of the valve.

In addition, the predetermined rotation axis of said at least one device for energy generation is oriented in a direction parallel to a longitudinal extension of the valve.

An installation as above specified ensures easy and immediate accessibility to the device for energy generation. In addition, this type of installation is preferably utilised for energising sensors/actuators installed on the valve itself.

In fact, advantageously, the wheel further comprises at least one system for detecting at least one operating parameter of the tyre and said at least one device for energy generation feeds said at least one detecting system.

According to an alternative embodiment, the wheel has a valve mounted on the rim and connected to the tyre and said at least one detecting system is installed on said valve. Preferably, said at least one device for energy generation is installed on a closing plug of the valve.

According to a further aspect, the present invention relates to a tyre for vehicle wheels, comprising at least one device for energy generation; wherein said at least one device for energy generation comprises: a first element adapted to be integrally linked to a portion of the tyre; a second element mounted on the first element and free to rotate relative to said first element around a predetermined rotation axis, the second element having a mass centre eccentric to the predetermined rotation axis; and an electric generator having a stator mounted on the first element and a rotor mounted on the second element.

In accordance with one embodiment, said at least one device for energy generation is installed on a radially internal surface of the tyre.

This solution enables the empty space inside the tyre to be exploited and the device to be protected; in addition this device can be brought into direct contact with the tyre regions submitted to deformation during rolling.

According to a preferred embodiment, said at least one device for energy generation is installed on a circumferential portion of the radially internal surface, close to a tread band of the tyre. This region has a substantially flat surface facilitating installation of the device.

Preferably, said at least one device for energy generation is installed close to an equatorial plane of the tyre.

In this manner, the predetermined rotation axis of said at least one device for energy generation is oriented in a radial direction of the tyre.

Alternatively, said at least one device for energy generation is installed on a side portion of the radially internal surface, close to a sidewall of the tyre.

Therefore, the predetermined rotation axis of said at least one device for energy generation is oriented in an axial direction of the tyre.

Installation on the tyre sidewall is preferably for tyres of greater sizes than those for cars, i.e. for tyres intended for industrial vehicles such as trucks and full trailers, lorries, etc.

Preferably, said at least one detecting system is installed on a radially internal surface of the tyre.

In this way all the detecting system is disposed at the inside of the tyre, the empty space within the tyre is utilised and this system can be easily replaced during replacement of the tyre itself.

Further features and advantages will become more apparent from the detailed description of a preferred, but not exclusive embodiment of a wheel for vehicles in accordance with the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

Figure 1:
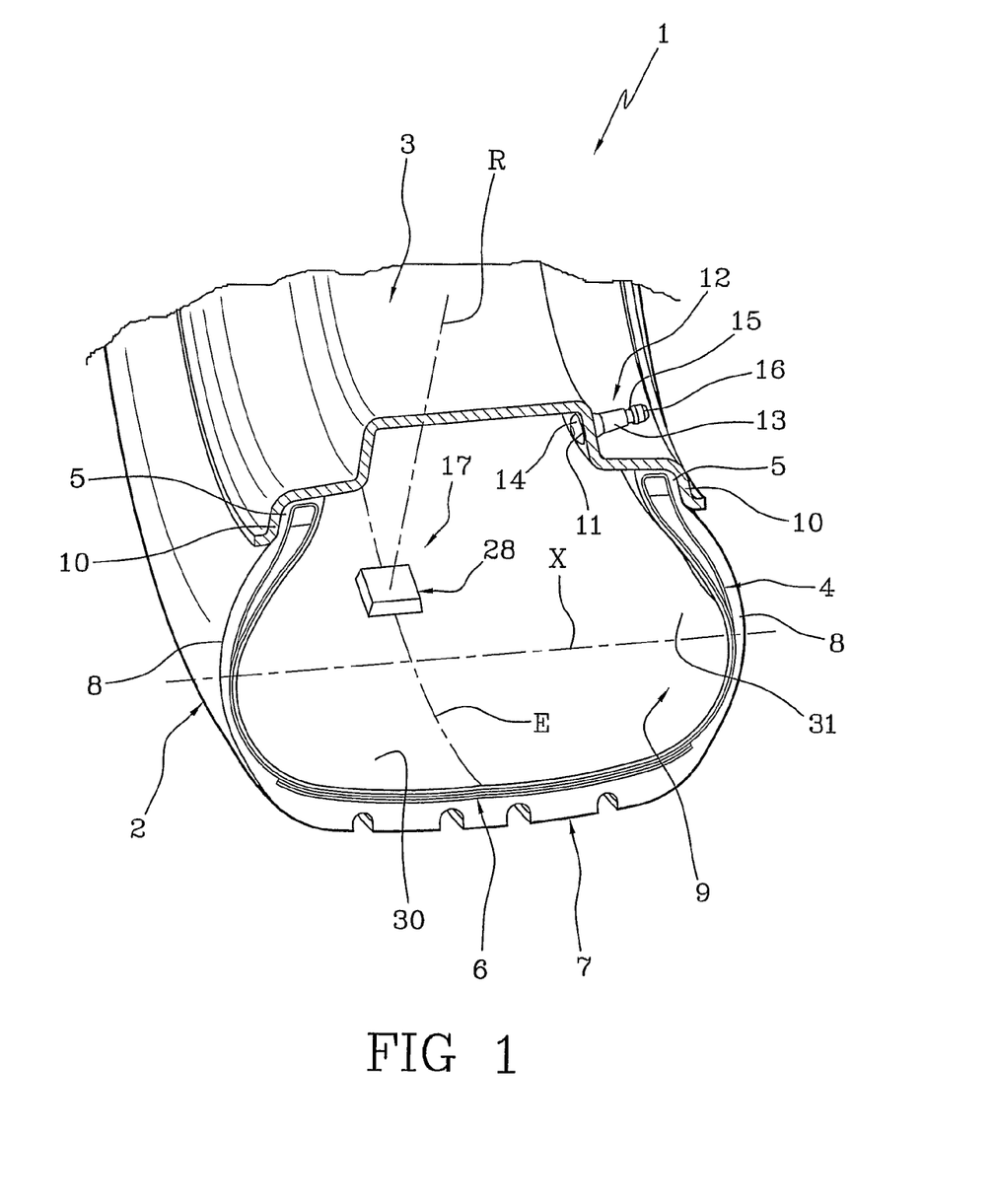
FIG. 1 is a perspective view in radial section of a portion of a wheel in accordance with the present invention.

FIG. 1 shows a first preferred embodiment of the wheel 1 in accordance with the invention, which comprises a tyre 2 mounted on a rim 3.

The wheel 1 can be mounted on any type of vehicle, i.e. for example cars, vehicles for goods transportation, such as trucks and full trailers or lorries, motor-vehicles, etc.

More particularly, tyre 2 is preferably designed to be used on vehicles provided with electronic devices installed on board and suitable for co-operating and interacting with further devices that are housed on or in the wheel 1 and will be described below.

Tyre 2 comprises a carcass structure 4, the same carcass structure 4 having at least one carcass ply, not shown in detail, shaped into a substantially toroidal conformation and in engagement, by its opposite circumferential edges, with a pair of annular anchoring structures, each of which is placed in a region 5 usually identified as "bead".

In particular, two annular anchoring structures are mutually spaced apart along an axial direction "X" of tyre 2, parallel to the geometric rolling axis of the tyre 2 itself.

Applied to the carcass structure 4, at a circumferentially external position, is a belt structure 6 comprising one or more belt strips.

Circumferentially overlapping the belt structure 6 is a tread band 7 in which longitudinal and transverse grooves are formed and disposed so as to define a desired "tread pattern".

Tyre 2 also comprises a pair of so-called sidewalls 8 laterally applied to the carcass structure 4 on opposite sides thereof.

The carcass structure 4 can possibly be coated on its inner sides with a so-called "liner", i.e. a sealing layer of airtight elastomeric material adapted to ensure hermetic tightness of the tyre itself when inflated.

Tyre 2 therefore has a radially internal surface 9 of substantially toroidal conformation, which internal surface 9 can be defined by said liner of elastomeric material.

The beads 5 in tyre 2 are engaged on edges 10 of the rim 3.

The rim 3 is further provided with a hole 11 into which a valve 12 defined by a cylindrical body 13 is seated. Mounted within the cylindrical body 13 is a valve body, not shown, and this cylindrical body 13 has a first end 14 facing the inside of tyre 2 and a second end 15, opposite to the first one 14, emerging from the rim 3 and provided with a closing plug 16.

The first end 14 of valve 12 is defined by a flexible portion, made of rubber for example, in engagement with the edges of the hole 11 formed in the rim 3.

By means of the inflating pressure of the tyre 2, the beads 5 are pressed against the edges 10 of the rim 3 so as to ensure the air-tightness of the tyre 2 on the rim 3 itself.

A tubeless tyre 2 has been hitherto described and illustrated, but the present invention also applies to tyres with an air tube, in which case the first end 14 of valve 12 is further connected to said air tube. Also advantageously mounted on wheel 1 is at least one device 17 for energy generation, which is operatively associated with tyre 2.

It is to be pointed out that by "device for energy generation operatively associated with a tyre" it is intended a device that can be fastened by at least one portion thereof, either onto the tyre or out of it. The device is in any case affected by the forces generated on the tyre itself during rolling on the ground.

The function of this device 17 for energy generation is to feed one or more devices preferably installed on the wheel and/or on/in the tyre. These devices can consist of systems for detecting one or more operating parameters of the tyre 2 itself for example, such as pressure, temperature, local deformations, accelerations, speed, etc.

In addition or as an alternative to feeding of the detecting systems, said device 17 for energy generation can be used to supply the necessary power to actuators such as pumps dedicated to maintenance of the right pressure within the tyre 2, for example.

More generally, the device 17 for energy generation is employed to supply the necessary electric energy required by any device mounted on wheel 1.

Figure 4:
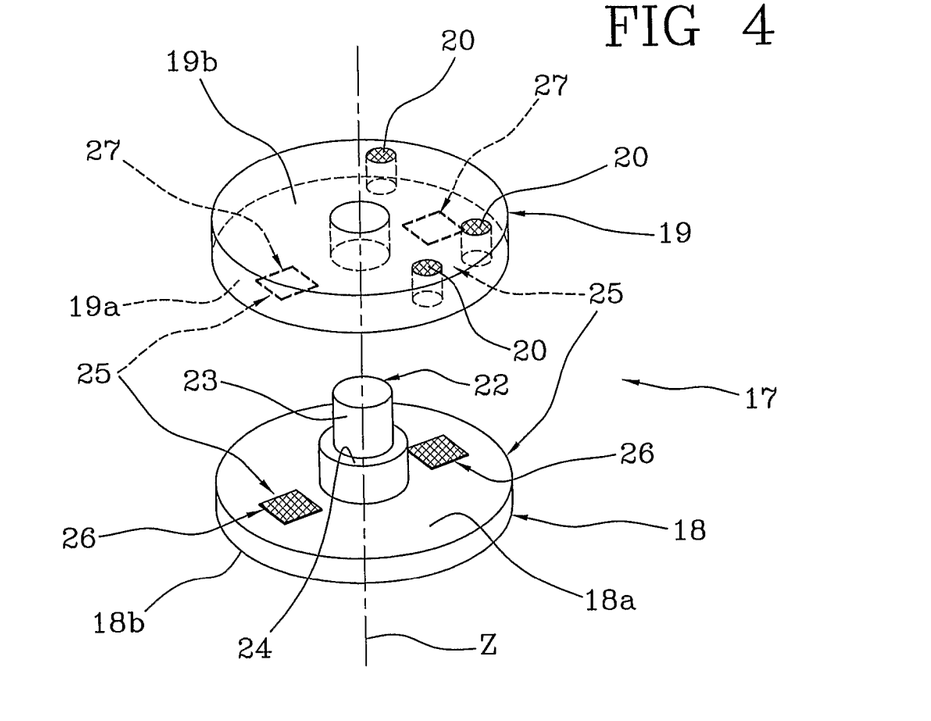
FIG. 4 is en exploded perspective view of an element of the wheel shown in the preceding figures.
Figure 5:
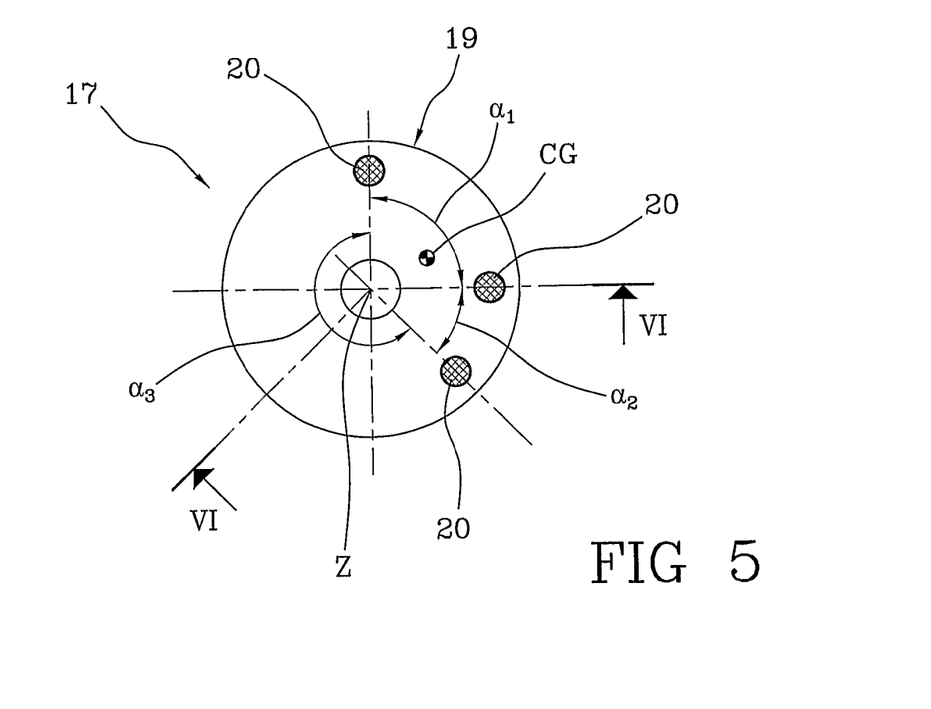
FIG. 5 is a plan view of the element in FIG. 4.
Figure 6:
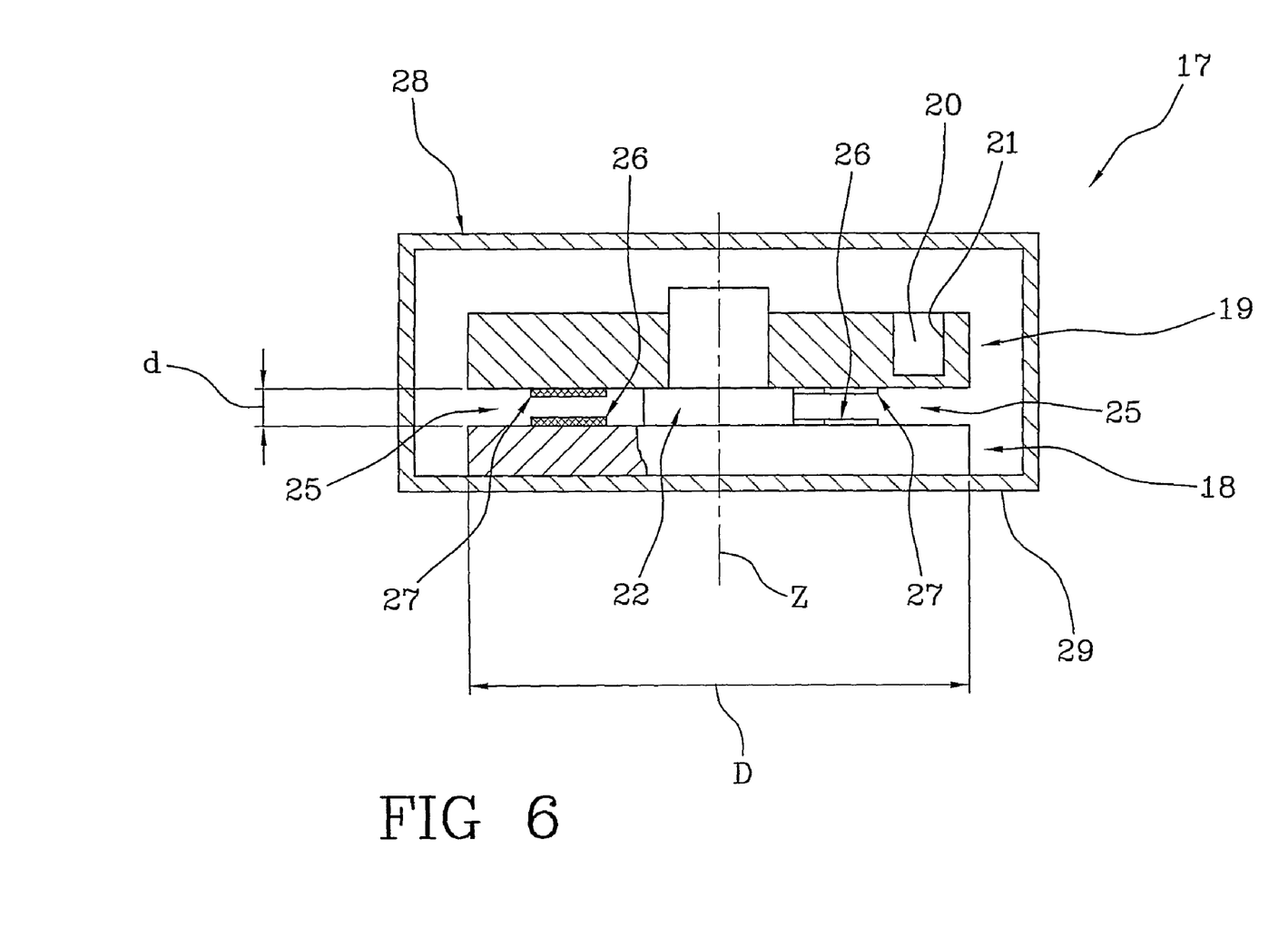
FIG. 6 is an elevation view partly in section of the element shown in FIG. 4 contained in a casing.

As diagrammatically shown in FIGS. 4, 5 and 6, the device 17 for energy generation comprises a first element 18, that is fixed relative to the rim 3 and/or the tyre 2, and a second element 19 that is mounted on the first element 18 and is free to rotate relative to said first element 19 around a predetermined rotation axis "Z".

The first element 18 has a first face 18a facing the second element 19 and a second face 18b opposite to the first one 18a. Likewise, the second element 19 has a first face 19a facing the first element 18 and a second face 19b opposite to the first one 18a.

The second element 19 is idly mounted on the first element 18 and can carry out any rotation relative to said first element 18, because no stop limit restricts this rotation.

The second element 19 further has a mass centre "CG" that is eccentric to the predetermined rotation axis "Z", so that any acceleration suffered by device 17 for energy generation gives rise to such inertial forces that a rotation/oscillation of the second element 19 on the first element 18 is determined.

In fact, as shown in FIG. 5, since the mass centre "CG" is spaced apart from the predetermined rotation axis "Z", any force applied to said mass centre "CG" generates an angular moment relative to axis "Z".

To place the mass centre "CG" in the desired position, the second element 19 preferably comprises at least one concentrated mass 20 spaced apart from the predetermined rotation axis "Z".

Preferably, the second element 19 comprises a plurality of concentrated masses 20 disposed around the predetermined rotation axis "Z".

By "concentrated mass" 20 it is intended a body separated from the second element 19, which body is fixed to said second element 19, for the purpose of shifting the centre of gravity "CG" to the desired position.

These masses 20 are positioned for instance on one of the faces 19a, 19b of the second element 19 or housed in suitable seats 21 formed in the second element 19 or contained within the thickness of said second element 19 (FIG. 6). In the last-mentioned case, the density "ρ" of the bodies corresponding to the masses 20 shall be different from that of the second element 19.

Alternatively, the second element 19 itself is made so as to show a lack of homogeneity in its mass distribution, so that its geometric centre through which the predetermined rotation axis "Z" passes is not coincident with the mass centre "CG".

According to a further alternative embodiment, the second element 19 has a symmetric shape with homogeneous mass distribution but the predetermined rotation axis "Z" does not pass through the mass centre "CG".

In a preferred embodiment herein shown, the first element 18 and second element 19 are defined by a first disc and a second disc, respectively. The first element 18 and second element 19 are therefore preferably circular, parallel, mutually spaced apart by a predetermined distance "d" and connected by a pin 22 extending along the predetermined rotation axis "Z". The pin 22 has a distal end 23 with a reduced section, so as to define a circular surface 24 on which the second element 19 rests and slides, said second element 19 therefore freely rotating on the pin 22 itself. Preferably interposed between the pin 22 and the second element 19 is material with a low friction coefficient, such as Teflon, treated copper, ball microbearings, so as to increase the efficiency of the device 17 for energy generation.

The first element 18 and second element 19 are preferably coaxial and the predetermined rotation axis "Z" preferably passes through the geometric centre of both of them extending orthogonal thereto.

The predetermined distance "d" is preferably included between about 1.2 mm and about 4 mm, and more preferably between about 1.5 mm and about 2.5 mm.

In addition, preferably, the diameter "D" of the first element 18 and second element 19 is included between about 6 mm and about 100 mm and depends on the position on wheel 1 at which the device 17 for energy generation is installed and on the sizes of said wheel 1.

This diameter "D" of the devices 17 for electric energy generation, installed in wheels for cars, is preferably included between about 6 mm and about 50 mm.

In addition, the ratio between said diameter "D" and the predetermined distance "d" existing between the first element 18 and second element 19 is preferably included between about 8 and about 20.

The second element 19 preferably comprises three concentrated masses 20 disposed around the predetermined rotation axis "Z" on the same circular path of travel.

Preferably, the three bodies corresponding to the three concentrated masses 20 are identical with each other i.e. they have the same volume "V" and the same density "ρ" and are buried into the second element 19, each in a respective seat 21.

The three concentrated masses 20 further have angular distances $\alpha_1$, $\alpha_2$, $\alpha_3$, that are different from each other and preferably correspond to 90°, 45° and 135°, respectively.

The device 17 for energy generation further comprises an electric generator 25 having a stator 26 mounted on the first element 18 and a rotor 27 mounted on the second element 19.

In the present specification and in the following claims, by "electric generator" it is intended any equipment capable of generating, due to relative rotation between one stator and one rotor, an electric voltage and therefore electric energy.

In addition, by "stator" 26 it is intended a first component of the electric generator 25 that is fixed relative to a predetermined reference system that, in the specific situation, is defined by rim 3 or tyre 2.

Finally, by "rotor" 27 it is intended a second component of the electric generator 25 that is mounted on the stator and rotates relative thereto.

By way of example only, the electric generator 25 can be of the electromagnetic type, i.e. capable of generating electric energy by means of the relative movement of a conductor in a magnetic field.

For instance, stator 26 is a conductive element (e.g. a coil) and rotor 27 is a magnet (e.g. a permanent magnet), or vice versa, rotor 27 defines the conductive element and stator 26 is a magnet.

Preferably, the electric generator 25 comprises and utilises materials known as "electrets" for electric-energy generation.

By the term "electret" (a word consisting of the combination of two words "electricity" and "magnet") it is intended a dielectric material having a quasi-permanent electric charge or a dipole polarisation. The term "quasi-permanent" means that the characteristic time scale for charge decay (ten years or centuries) is much longer than the periods during which studies on said materials have been conducted.

Any material of the "electret" type can be used for accomplishment of the electric generator 25, such as, among natural materials, quartz and other forms of silicon dioxides, or insulating polymers (i.e. fluorine polymers, polypropylene, polyethylene terephthalate). An "electret" material is prepared by cooling a dielectric material in an electric field after heating it to high temperature.

Generation of energy in the electric generator 25 takes place through relative movement of an element consisting of an "electret" material (stator or rotor) relative to a conductive element (rotor or stator) placed in close proximity thereto. This movement gives rise to a variation in the electric potential of the conductive element relative to the element of material of the "electret" type.

In accordance with one embodiment, stator 26 is a conductive element and rotor 27 comprises a material of the "electret" type. Alternatively, rotor 27 is a conductive element and stator 26 comprises a material of the "electret" type.

Preferably, stator 26 and rotor 27 mutually face and are placed on the first faces 18a, 19a opposite to each other belonging to the first element 18 and second element 19, respectively.

In addition, both stator 26 and rotor 27 are preferably defined by thin plates applied to said faces 18a, 19a.

The number, arrangement, geometry and extension of the thin plates can be of any nature and is designed based on the specific requirements.

In a preferred embodiment herein illustrated, stator 26 and rotor 27 each have two thin plates disposed symmetrical to pin 22.

Preferably, the device 17 for energy generation further comprises a casing 28 within which the first 18 and second 19 elements are installed. In more detail, according to the schematic description shown in FIG. 6, the first element 18 is fastened to the casing 28 so that its face 18b is in engagement with a base wall 29 of said casing 28. Casing 28 is fastened to wheel 1.

Preferably, the predetermined rotation axis "Z" of device 17 for energy generation is oriented in a radial direction "R" of tyre 2. In this configuration, the forces causing rotation of the second element 19 on the first element 18 are the longitudinal forces directed in the same way as the motion direction of wheel 1, and the side forces parallel to the geometric rolling axis of the tyre 2 itself.

Figure 2:
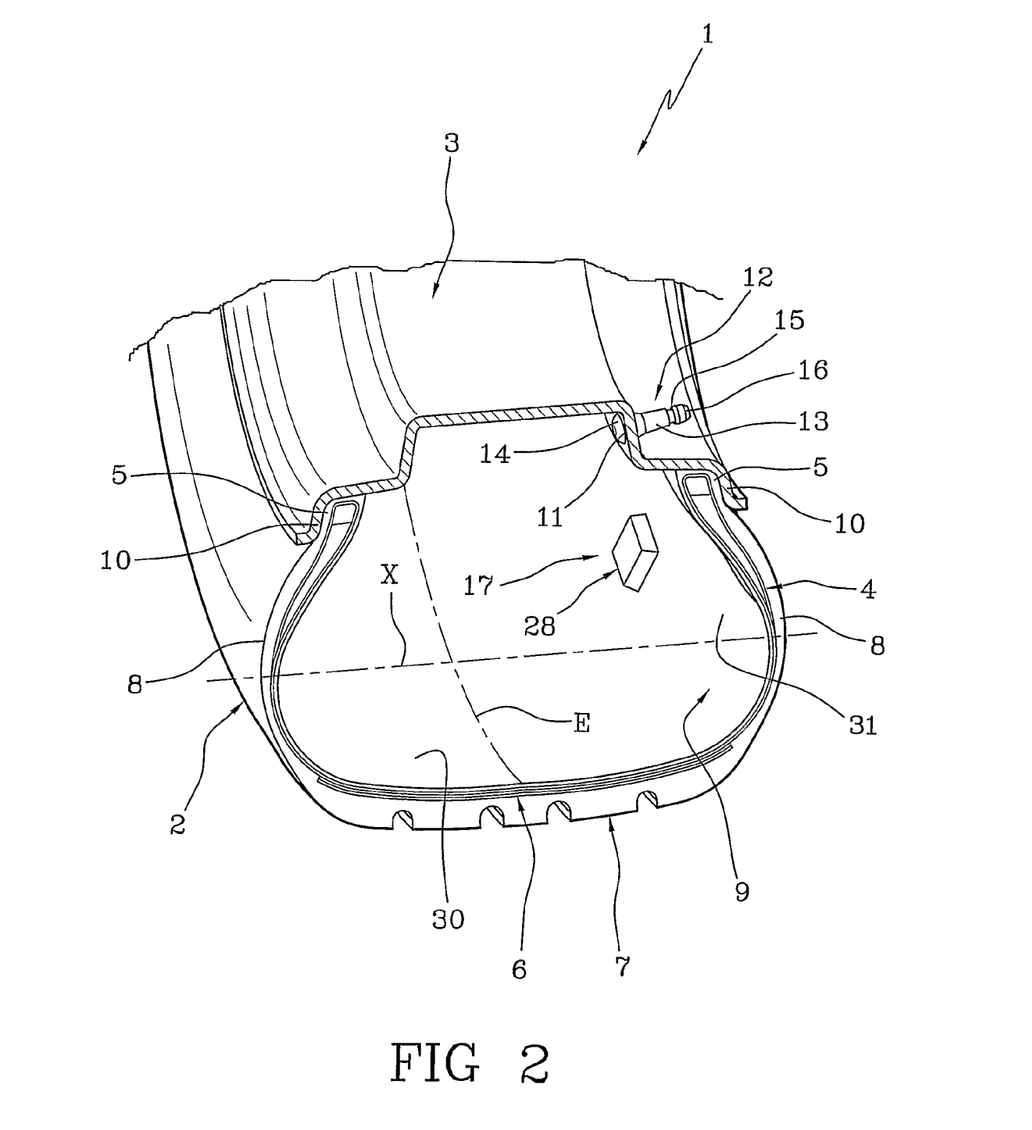
FIG. 2 shows an alternative embodiment of the wheel seen in FIG. 1.

Alternatively, the predetermined rotation axis "Z" of device 17 for energy generation can be oriented in the axial direction "X" of tyre 2. In this configuration, the forces causing rotation of the second element 19 on the first element 18 are the longitudinal and radial forces.

In addition, said device 17 for energy generation can be mounted on rim 3 or on a portion of tyre 2, preferably within the tyre 2 itself.

As shown in FIGS. 1 and 2, the device 17 for energy generation is installed on the radially internal surface 9 of tyre 2.

In particular, in the embodiment shown in FIG. 1, the device 17 for energy generation is installed on a circumferential portion 30 of the radially internal surface 9, at the tread band 7 of tyre 2 and, preferably, at an equatorial plane "E" of the tyre 2 itself. Preferably, the base wall 29 of casing 28 is in engagement with the radially internal surface 9. Therefore, the predetermined rotation axis "Z" is substantially oriented in the same manner as the radial direction "R" of tyre 2.

In the embodiment shown in FIG. 2, the device 17 for energy generation is installed on a side portion 31 of the radially internal surface 9, at the sidewall 8. In this case too, preferably the base wall 29 of casing 28 is in engagement with the radially internal surface 9. Therefore, the predetermined rotation axis "Z" is substantially oriented in the same manner as the axial direction "X" of tyre 2.

Installation at the inside of tyre 2 is preferred when the device 17 for energy generation is used to power devices also installed at the inside of tyre 2, close to the device 17 for energy generation such as detecting systems installed on the radially internal surface 9 of tyre 2.

Since the device 17 for energy generation, when installed on the radially internal surface 9, is directly associated with the tyre carcass 4, this device 17 for energy generation is subject to the accelerations due to local deformations of tyre 2. These deformations are greater at the footprint area on the ground and generate variable accelerations decomposable according to the three, longitudinal, lateral and radial, axes.

To these accelerations are to be vectorially added the accelerations imparted by the motor, the braking system and the forces transmitted from the road surface, that are decomposable too in the three axes, i.e. longitudinal, lateral and radial.

The device 17 for energy generation is submitted to all the three mentioned components but only those lying in a plane orthogonal to the predetermined rotation axis "Z" cause rotation of rotor 27 and generation of electric energy.

Figure 3:
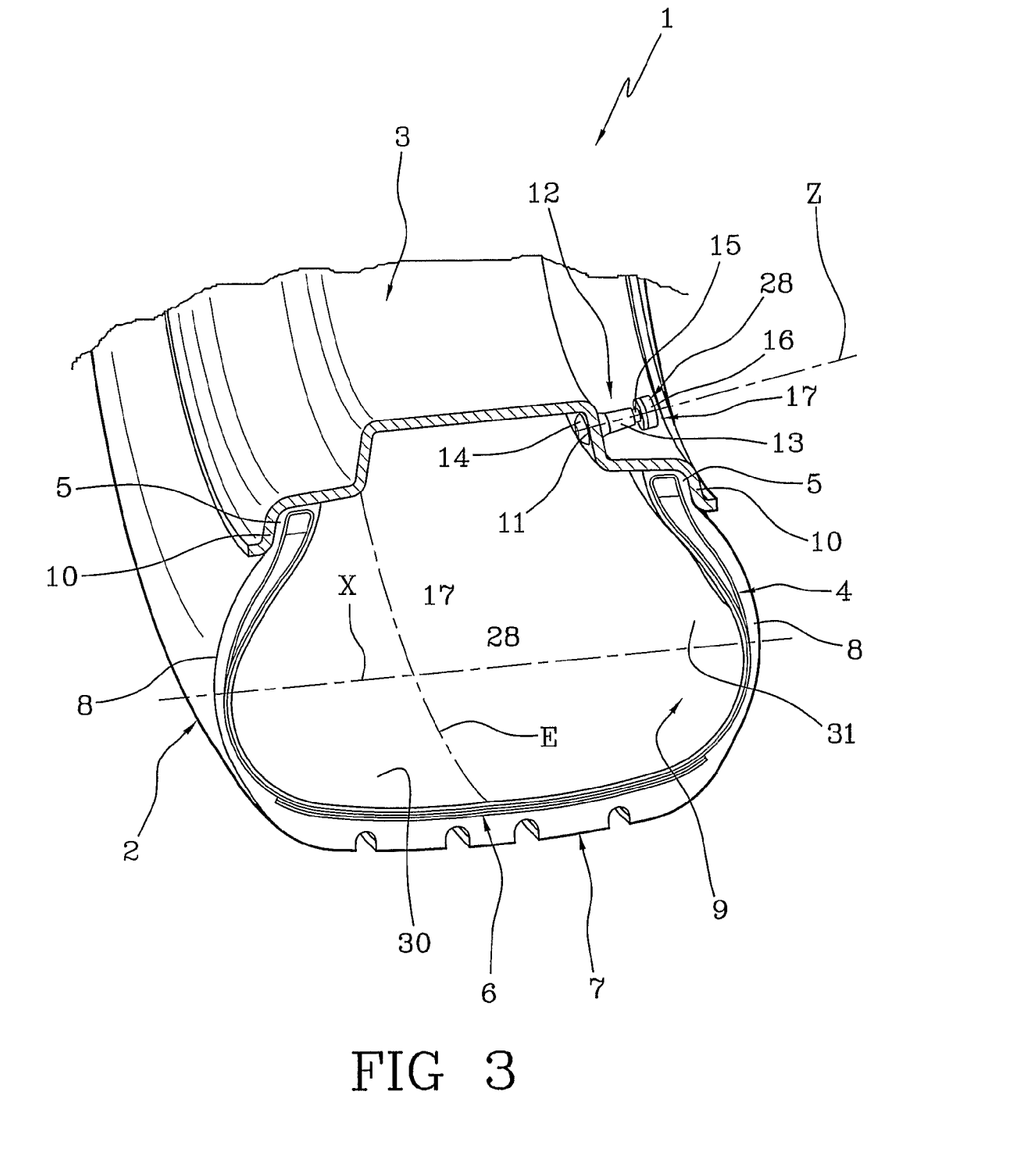
FIG. 3 shows a further embodiment of the wheel in FIG. 1.

In accordance with a further embodiment shown in FIG. 3, the device 17 for energy generation is mounted on valve 12 installed on rim 3. In particular, the device 17 for energy generation is positioned on the closing plug 16 of valve 12.

The tyre 2 shown in FIG. 3 is of the tubeless type, i.e. it is devoid of an air tube. The valve 12 is therefore connected to the rim 3 alone and is not directly submitted to the stresses resulting from local deformations of tyre 2. The valve 12 in any case suffers from pressure pulses due to passage of said pressure through the region of greater compression of tyre 2 corresponding to the footprint area of tyre 2 on the ground, thanks to said flexibility of the first end 14. Valve 12 is further submitted to the accelerations imparted by the motor, the braking system and the forces transmitted from the road surface through the tyre 2.

It is to be pointed out that the device 17 for energy generation suffers in any case from at least part of the forces generated on tyre 2 during rolling of same on the ground and, therefore, falls within the above depicted definition of "device for energy generation operatively associated with a tyre".

These accelerations, in particular at each passage of the tread region radially corresponding to the valve on the footprint region, cause oscillation of valve 12 on the flexible portion 14 in engagement with the edges of hole 11 formed in the rim 3 and are therefore transmitted to the device 17 for energy generation placed on the closing plug 16.

Should valve 12 be connected to an air tube, not shown, also the stresses resulting from the local deformations of tyre 2 would be partly transmitted to the device 17 for energy generation, at least for the above illustrated reason.

Orientation of the device 17 for energy generation on the plug 16 is selected for maximising rotation/oscillation of rotor 27 on stator 26.

For instance, the predetermined rotation axis "Z" of the device 17 for energy generation is oriented in a direction parallel to the longitudinal extension of valve 12.

Installation of the device 17 for energy generation on plug 16 is preferred when a detecting system not shown is present and installed on valve 12 for detecting the inflating pressure of tyre 2 for example, or there is a pump for keeping this inflating pressure constant.

The invention claimed is:

1. A wheel for vehicles comprising:
a rim;
a tyre mounted on the rim; and at least one device for energy generation operatively associated with said tyre, wherein said at least one device for energy generation comprises:
  a first element that is fixed relative to said rim or to said tyre;
  a second element mounted on the first element and free to rotate relative to said first element around a predetermined rotation axis, the second element having a mass centre eccentric to the predetermined rotation axis; and
  an electric generator having a stator mounted on the first element and a rotor mounted on the second element.

2. The wheel as claimed in claim 1, wherein the second element comprises at least one concentrated mass spaced apart from the predetermined rotation axis.

3. The wheel as claimed in claim 1, wherein the second element comprises a plurality of concentrated masses disposed around the predetermined rotation axis.

4. The wheel as claimed in claim 1, wherein the second element comprises three concentrated masses disposed around the predetermined rotation axis.

5. The wheel as claimed in claim 4, wherein the three concentrated masses have angular distances different from each other.

6. The wheel as claimed in claim 3, wherein bodies corresponding to the concentrated masses have a same density and same volume.

7. The wheel as claimed in claim 1, wherein the first element and second element are defined by respective parallel discs mutually spaced apart and connected by a pin extending along the predetermined rotation axis.

8. The wheel as claimed in claim 7, wherein the discs are coaxial.

9. The wheel as claimed in claim 1, wherein the stator is a conductive element and the rotor is a permanent magnet.

10. The wheel as claimed in claim 1, wherein the rotor is a conductive element and the stator is a permanent magnet.

11. The wheel as claimed in claim 1, wherein the stator is a conductive element and the rotor comprises a material of the electret type.

12. The wheel as claimed in claim 1, wherein the rotor is a conductive element and the stator comprises a material of the electret type.

13. The wheel as claimed in claim 1, wherein said at least one device for energy generation further comprises a casing housing the first element and the second element.

14. The wheel as claimed in claim 1, wherein the predetermined rotation axis of said at least one device for energy generation is oriented in a radial direction of the tyre.

15. The wheel as claimed in claim 1, wherein the predetermined rotation axis of said at least one device for energy generation is oriented in an axial direction of the tyre.

16. The wheel as claimed in claim 1, comprising a valve mounted on the rim, wherein said at least one device for energy generation is installed on said valve.

17. The wheel as claimed in claim 16, wherein said at least one device for energy generation is installed on a closing plug of the valve.

18. The wheel as claimed in claim 16, wherein the predetermined rotation axis of said at least one device for energy generation is oriented in a direction parallel to a longitudinal extension of the valve.

19. The wheel as claimed in claim 1, further comprising at least one system for detecting at least one operating parameter of the tyre, wherein said at least one device for energy generation feeds said at least one detecting system.

20. The wheel as claimed in claim 19, comprising a valve mounted on the rim and connected to the tyre, wherein said at least one detecting system is installed on said valve.

21. The wheel as claimed in claim 20, wherein said at least one device for energy generation is installed on a closing plug of the valve.

22. A tyre for vehicle wheels, comprising at least one device for energy generation, said at least one device for energy generation comprising:
  a first element integrally linked to a tyre portion;
  a second element mounted on the first element and free to rotate relative to said first element around a predetermined rotation axis, the second element having a mass centre eccentric to the predetermined rotation axis; and
  an electric generator having a stator mounted on the first element and a rotor mounted on the second element.

23. The tyre as claimed in claim 22, wherein the second element comprises at least one concentrated mass spaced apart from the predetermined rotation axis.

24. The tyre as claimed in claim 22, wherein the second element comprises a plurality of concentrated masses disposed around the predetermined rotation axis.

25. The tyre as claimed in claim 22, wherein the second element comprises three concentrated masses disposed around the predetermined rotation axis.

26. The tyre as claimed in claim 23, wherein the three concentrated masses have angular distances different from each other.

27. The tyre as claimed in claim 24, wherein bodies corresponding to the concentrated masses have a same density and same volume.

28. The tyre as claimed in claim 22, wherein the first element and second element are defined by respective parallel discs mutually spaced apart and connected by a pin extending along the predetermined rotation axis.

29. The tyre as claimed in claim 28, wherein the discs are coaxial.

30. The tyre as claimed in claim 22, wherein the stator is a conductive element and the rotor is a permanent magnet.

31. The tyre as claimed in claim 22, wherein the rotor is a conductive element and the stator is a permanent magnet.

32. The tyre as claimed in claim 22, wherein the stator is a conductive element and the rotor comprises a material of the electret type.

33. The tyre as claimed in claim 22, wherein the rotor is a conductive element and the stator comprises a material of the electret type.

34. The tyre as claimed in claim 22, wherein said at least one device for energy generation further comprises a casing housing the first element and the second element.

35. The tyre as claimed in claim 22, wherein said device for energy generation is installed on a radially internal surface of the tyre.

36. The tyre as claimed in claim 35, wherein said at least one device for energy generation is installed on a circumferential portion of the radially internal surface close to a tread band of the tyre.

37. The tyre as claimed in claim 36, wherein said at least one device for energy generation is installed close to an equatorial plane of the tyre.

38. The tyre as claimed in claim 35, wherein said at least one device for energy generation is installed on a side portion of the radially internal surface, close to a sidewall of the tyre.

39. The tyre as claimed in claim 22, wherein the predetermined rotation axis of said at least one device for energy generation is oriented in a radial direction of the tyre.

40. The tyre as claimed in claim 22, wherein the predetermined rotation axis of said at least one device for energy generation is oriented in an axial direction of the tyre.

41. The tyre as claimed in claim 22, further comprising at least one system for detecting at least one operating parameter of the tyre, wherein said at least one device for energy generation feeds said at least one detecting system.

42. The tyre as claimed in claim 41, wherein said at least one detecting system is installed on a radially internal surface of the tyre.

43. A wheel for vehicles comprising:
a rim;
a tyre mounted on the rim; and
at least one device for energy generation operatively associated with said tyre, wherein said at least one device for energy generation comprises:
  a first element that is fixed relative to said rim or to said tyre;
  a second element mounted on the first element and free to rotate relative to said first element around a predetermined rotation axis, the second element having a mass centre eccentric to the predetermined rotation axis, the second element comprising a plurality of concentrated masses disposed around the predetermined rotation axis; and
  an electric generator having a stator mounted on the first element and a rotor mounted on the second element.

44. A tyre for vehicle wheels, comprising at least one device for energy generation, said at least one device for energy generation comprising:
  a first element integrally linked to a tyre portion;
  a second element mounted on the first element and free to rotate relative to said first element around a predetermined rotation axis, the second element having a mass centre eccentric to the predetermined rotation axis, the second element comprising a plurality of concentrated masses disposed around the predetermined rotation axis; and
  an electric generator having a stator mounted on the first element and a rotor mounted on the second element.

* * * * *